United States Patent [19]

Poulsen

[11] 4,040,682

[45] Aug. 9, 1977

[54] MECHANISM FOR TRANSFORMATION OF A ROTARY MOTION INTO A TRANSLATORY MOTION OR VICE VERSA

[76] Inventor: Peder Ulrik Poulsen, Lonholt Ladegaard, DK-3480 Fredensborg, Denmark

[21] Appl. No.: 698,865

[22] Filed: June 23, 1976

[30] Foreign Application Priority Data

July 8, 1975 Denmark ............................ 3075/75

[51] Int. Cl.² ............................................ F16C 19/04
[52] U.S. Cl. ...................................... 308/176; 74/25; 74/57; 308/189 R
[58] Field of Search ............... 308/176, 189 R, 207 R; 74/25, 57

[56] References Cited
U.S. PATENT DOCUMENTS

| 3,424,012 | 1/1969 | Hirmann | 74/25 |
| 3,590,644 | 7/1971 | Kuspert | 74/57 |
| 3,966,280 | 6/1976 | Olrik | 308/176 |

Primary Examiner—Joseph F. Peters, Jr.
Assistant Examiner—Gene A. Church
Attorney, Agent, or Firm—Burgess, Ryan and Wayne

[57] ABSTRACT

The invention relates to a mechanism for transformation of a rotary motion into a translatory motion or vice versa, consisting of a curve follower for co-operation with a rotary cylindrical curve body, in which is designed a curved guide in the shape of a wedge-shaped track in the body, and where the curve follower consists of an inwardly pointing similar wedge-shaped ring with a larger diameter than that of the curved body, and which is located excentrically in relation to the latter in such a manner, that the inner edge of the ring meshes with the track. The ring is the inner ring of a roller- or ball bearing or is incorporated with such an inner ring while the outer ring or parts connected therewith are retained against rotation in relation to the curved body or vice versa.

2 Claims, 3 Drawing Figures

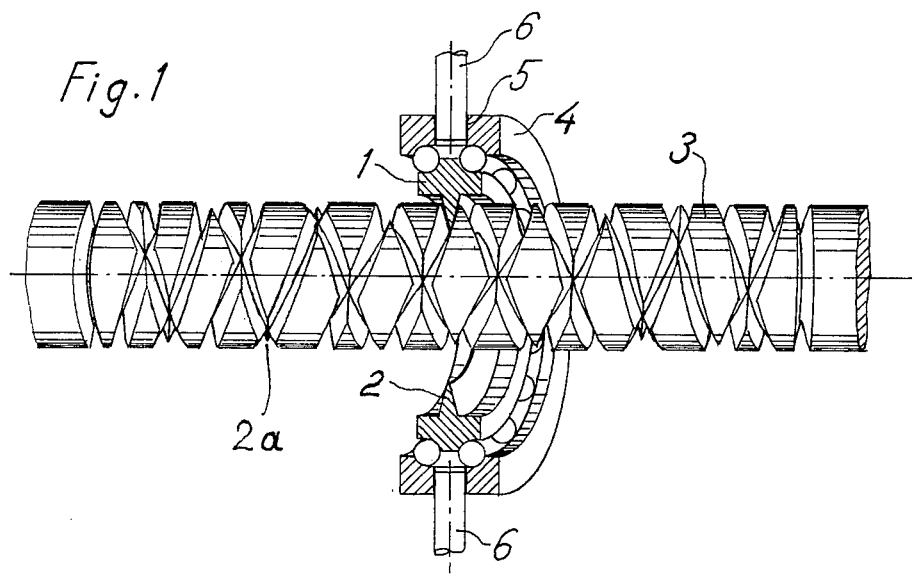
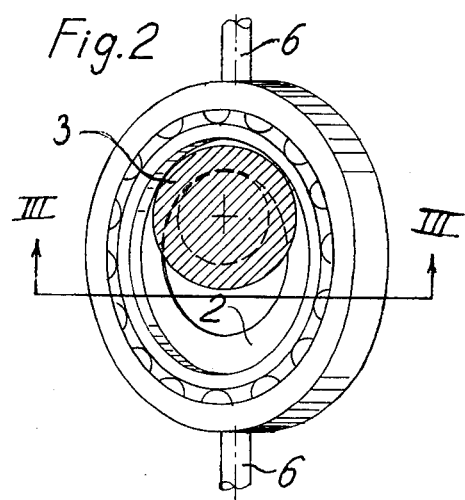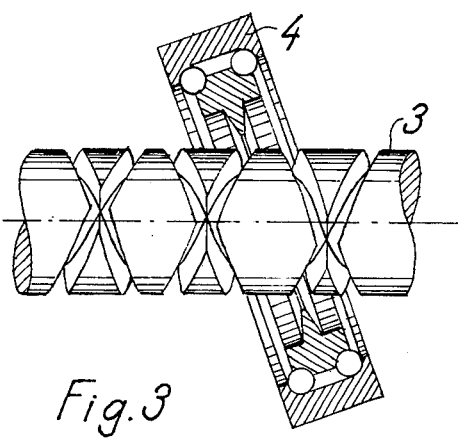

MECHANISM FOR TRANSFORMATION OF A ROTARY MOTION INTO A TRANSLATORY MOTION OR VICE VERSA

From the German Pat. No. 2,129,345, laid open for public inspection such for a mechanism is known, in which the curved guide has a constant pitch. This mechanism, therefore, has the same properties as a usual spindle structure as far as the transformation of a motion is concerned, i.e. by way of example a constant speed rotational movement can be transformed into a rectilinear motion with a constant speed, until the curve follower has reached an end position. Then it will be necessary to change the sense of rotation.

The present invention relates to a further development of said invention.

The mechanism according to the invention is characterized in that the outer ring of the bearing is mounted pivotally about an axis situated in the plane of the bearing and going through the center of the bearing in such a manner, that this axis mainly goes through the point of engagement and preferably is at right angles to the axis of the curved body.

In such a structure it is possible to let the pitch vary under retention of a safe engagement between the curved body and the curve follower at the same time as this engagement becomes far less friction stressed than known structures with varying pitch.

When it is possible to let the pitch vary, it is therefore also possible according to the invention to let the track be endless, and such a structure offers a new and surprising component for the transformation of a rotary motion with one and the same sense of rotation into a reciprocating motion, the variation of speed of which may be chosen rather arbitrarily. A decisive feature in this structure must be seen in the easy and safe manner in which it is possible with the curve follower to pass the positions of the curved body, where two wedge-shaped tracks are crossing each other. As seen in the tangential direction of the curved guide in the point of contact a rolling will take place at one radius at least, and as the engagement covers a longer stretch, particularly if there is no great difference in the diameters of the curved body respectively the curve follower, i.e. the wedge-shaped ring, the latter will have no trend of rolling in the track. It is in reality possible to design the track in such a manner that rolling is made impossible.

If the pitch of the curved body increases with the axial motion, the side of the wedge-shaped ring facing the axial sense of motion will have two points of contact or impact points in proportion to the other side of the track. Under such circumstances the other side of the track can be designed as kind of envelope for points lying between the two points of contact and hereby it is possible to prevent rolling motions. If the pitch of the curved guide decreases with the axial motion, the case will be opposite.

The invention will now be explained in details with reference to the drawing in which FIG. 1 shows a curved body in side elevation with a curve follower according to the invention in section through the axis of rotation and as seen in perspective, FIG. 2 shows the curved body with the curve follower as seen from the end, but with the curved body shown in section, and FIG. 3 a section on the line III—III in FIG. 2.

In FIG. 1 an inner ring 1 of a ball bearing is designed with a curve follower in the shape of a wedge-shaped ring 2, which meshes with a curved guide 2a of a curved body 3. The engagement is excentric as also appears from FIG. 2, as the outer ring 4 of the ball bearing is pivotally mounted about one of the diameters of the ball bearing, which goes through the axis of the curved body 3 and mainly through the point of contact, where the wedge-shaped ring 2 meshes with the curved guide 2. The pivotal mounting about one of the diameters of the ball bearing has been provided by means of pins 6, which are fastened in holes 5 of the outer ring 4 and through guide members (not shown), which form no part of the invention, but which are naturally necessary. As appears from FIG. 2 the engagement covers more than 180° of the periphery of the curved body 3, and by virtue of this feature, the reversal of motion of the curve follower can be safely accomplished when the curved guide 2a crosses itself in the embodiment where the guide is endless and thereby shows a varying pitch. The cross section which the curved guide or the track 2a shows, will, as seen in the tangential direction on the stretches, where the pitch varies, be broader than the the cross section of the wedge-shaped ring 2.

I claim:

1. Mechanism for transformation of a rotary motion into a translatory motion or vice versa, comprising a curve follower and a rotary cylindrical curve body, said curve body being provided with a curved guide in the shape of a track in the body, the curve follower comprising a ring with a larger diameter than that of the curved body, and located eccentrically on the body in such a manner that the inner edge of the ring meshes with the track, the ring being the inner ring of a roller or ball bearing, characterized in that the outer ring of the bearing is pivotally mounted about an axis situated in the plane of the bearing in such a manner that this axis mainly goes through the point of engagement and preferably is at right angles to the axis of the curve body.

2. Mechanism according to claim 1, characterized in that, the curved guide or the track is endless, i.e. that it has at least two points of inflection and several crossing points.

* * * * *